United States Patent
Lo

(10) Patent No.: US 8,122,183 B2
(45) Date of Patent: Feb. 21, 2012

(54) DATA MANAGING METHOD FOR FLASH MEMORY AND FLASH MEMORY DEVICE USING THE SAME

(75) Inventor: Pang-Mei Lo, Keelung (TW)

(73) Assignee: Silicon Motion, Inc., Jhubei (TW)

( * ) Notice: Subject to any disclaimer, the term of this patent is extended or adjusted under 35 U.S.C. 154(b) by 407 days.

(21) Appl. No.: 12/371,903

(22) Filed: Feb. 16, 2009

(65) Prior Publication Data
US 2010/0153623 A1    Jun. 17, 2010

(30) Foreign Application Priority Data
Dec. 15, 2008    (TW) .................................. 97148724

(51) Int. Cl.
*G06F 12/00*    (2006.01)
(52) U.S. Cl. ......... 711/103; 711/E12.001; 711/E12.008; 365/185.33

(58) Field of Classification Search .................. 711/103, 711/E12.001, E12.008; 365/185.33
See application file for complete search history.

(56) References Cited

U.S. PATENT DOCUMENTS
2009/0070520 A1 *    3/2009    Mizushima ................... 711/103
* cited by examiner

*Primary Examiner* — Jasmine Song
(74) *Attorney, Agent, or Firm* — Wang Law Firm, Inc.; Li K. Wang

(57) ABSTRACT

A data management method for a flash memory apparatus, entailing a step for handling a plurality of flash chips, a step for enabling the flash chips in sequence, and a step for updating the first data in the first block on the first flash chip among the flash chips. Additionally there is a step for updating f writing of the first new data corresponding to the first data into a second block in a second flash chip among the flash chips, and a step merging the first block and the second block, wherein both of the first new data and the first data are corresponding to a first logical block address.

16 Claims, 6 Drawing Sheets

DATA MANAGING METHOD FOR FLASH MEMORY AND FLASH MEMORY DEVICE USING THE SAME

CROSS REFERENCE TO RELATED APPLICATIONS

This Non-provisional application claims priority under 35 U.S.C. 119(a) on Patent Application No(s). 97148724, filed in Taiwan, Republic of China on Dec. 15, 2008, the entire contents of which are hereby incorporated by reference.

BACKGROUND OF THE INVENTION

1. Field of the Invention

The present invention relates to non-volatile memory, and in particular relates to a data managing method for the non-volatile memory.

2. Description of the Related Art

Flash memory is a kind of non-volatile memory which has developed rapidly in recent years. With low power consumption, small size and reliability, flash memory has become a popular auxiliary memory in computers. FIG. 1 is a schematic diagram of the flash memory. The flash memory apparatus 100 comprising a controller 102 and a flash chip 104 is used to transmit data with a host 110. The controller 102 uses a control line 106 to enable the flash chip 104 so that the flash chip 104 could be accessed by the controller 102. Moreover, those skilled in the art know that there is a translation table in the controller 102 having a function to translate logical block address (LBA) into physical block address (PBA). Therefore, data D0~D4 respectively corresponding to LBA L00~L04 (not shown in FIG. 1) are respectively stored into the PBA A00~A04 in the block A of the flash chip 104.

Additionally, the flash chip 104 has several features that are (1) using a page, which is equal to 2K bytes, as a minimum unit to be read or written; while (2) using a block, which equals to about 64 pages (about 128K bytes), as a minimum unit to be erased. Based on those limitations, one should consider that in many respects operating flash memory, and managing flash memory is quite important.

FIG. 2 is an illustrative diagram showing the updating process performed in the flash memory. Referring to FIGS. 1 and 2, when performing the updating process, the flash memory apparatus 100 receives updated data D1 corresponding to LBA L01 from the host 110 to replace the data D1 corresponding to the same LBA L01 stored in block A. However, the data D1 originally stored in PBA A01 in block A can not be overwritten or directly erased, therefore it has to be labeled as "pseudo-erased" and would be actually erased at the proper time. Further, the 120 establishes another new block B in the flash chip 104 for the updated data D1 to be written in (for example, written in PBA B01), and alters the correspondence between the LBA and PBA of the translation table.

The complete updating process further comprises merging the un-updated data D0, D2~D4 in block A with the updated data D1 in block B (to be discussed later), and "real-erasing" block A to free up space in the flash chip 104. However, at the time of real-erasing, the flash memory apparatus 100 can not be written to or read from so that the performance thereof is influenced. Therefore, it may be desirable in some applications to provide a data managing method for improving the updating performance.

BRIEF SUMMARY OF INVENTION

A data managing method for flash memory is provided, comprising a plurality of flash chips; enabling the flash chips respectively; and updating the first data in a first block on a first flash chip among the flash chips, wherein the step of updating further comprises writing the first new data corresponding to the first data into a second block on a second flash chip among the flash chips; and merging the first block and the second block, wherein both of the first new data and the first data are corresponding to a first logical block address.

A flash memory apparatus is provided, comprising a plurality of flash chips and a controller. The controller is used for enabling the flash chips respectively; and updating the first data in the first block on the first flash chip among the flash chips. The step of updating further comprises writing first new data corresponding to the first data into a second block in a second flash chip among the flash chips; and merging the first block and the second block, wherein both of the first new data and the first data are corresponding to a first logical block address.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
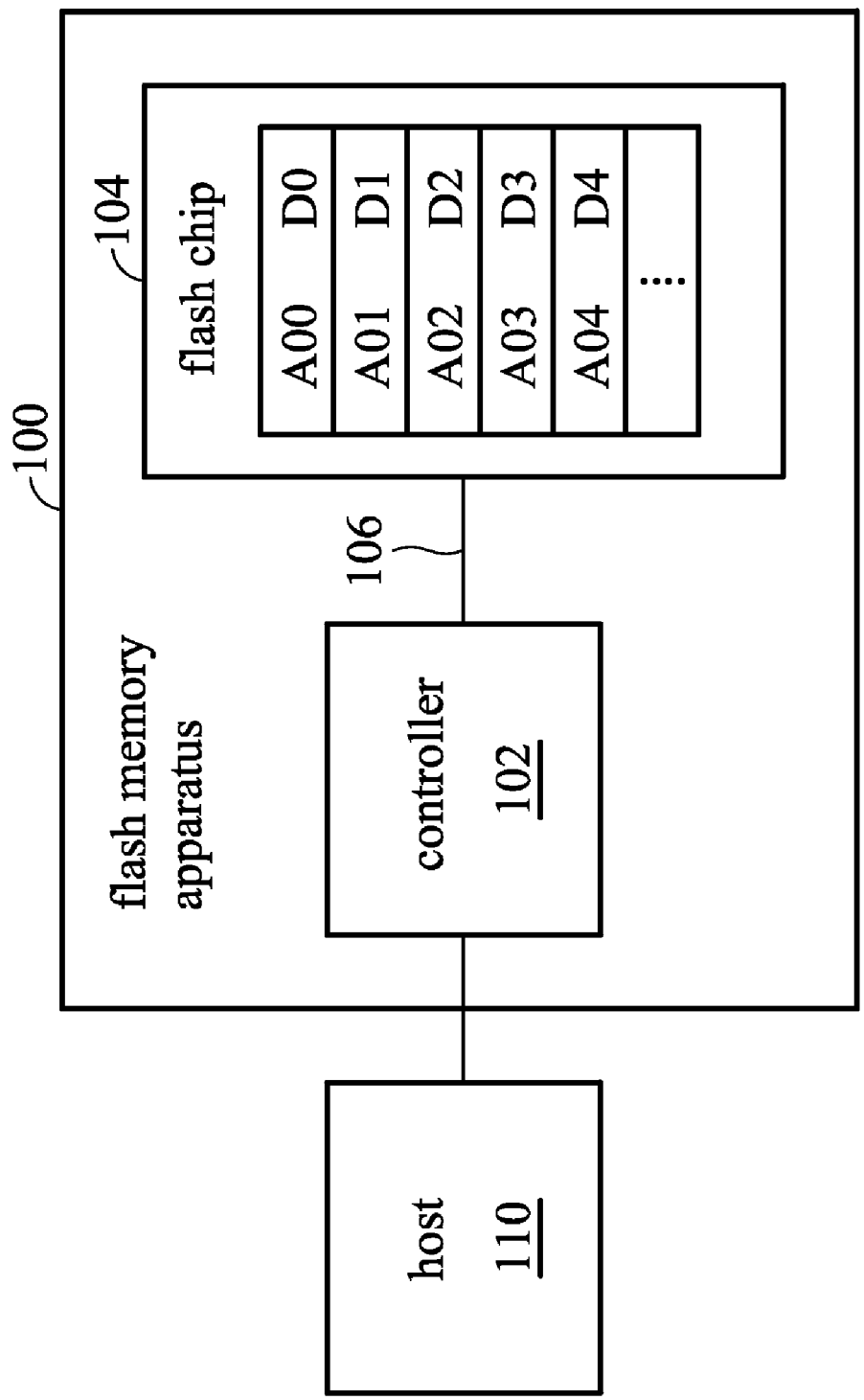
FIG. 1 is a schematic diagram of the flash memory.
Figure 2:
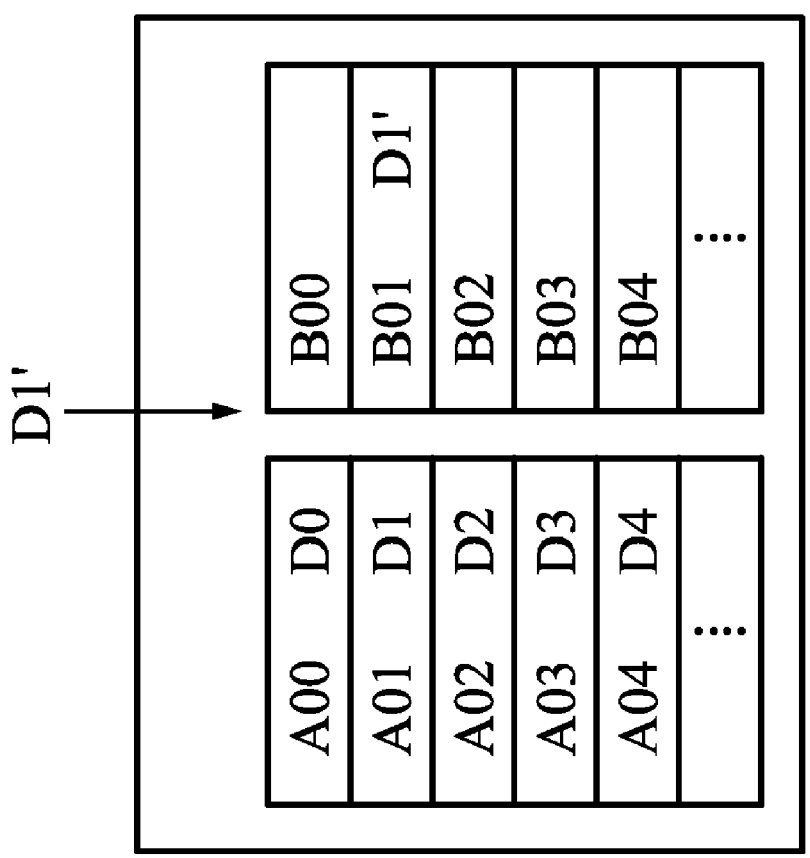
FIG. 2 is an illustrative diagram showing the updating process performed in the flash memory.
Figure 3:
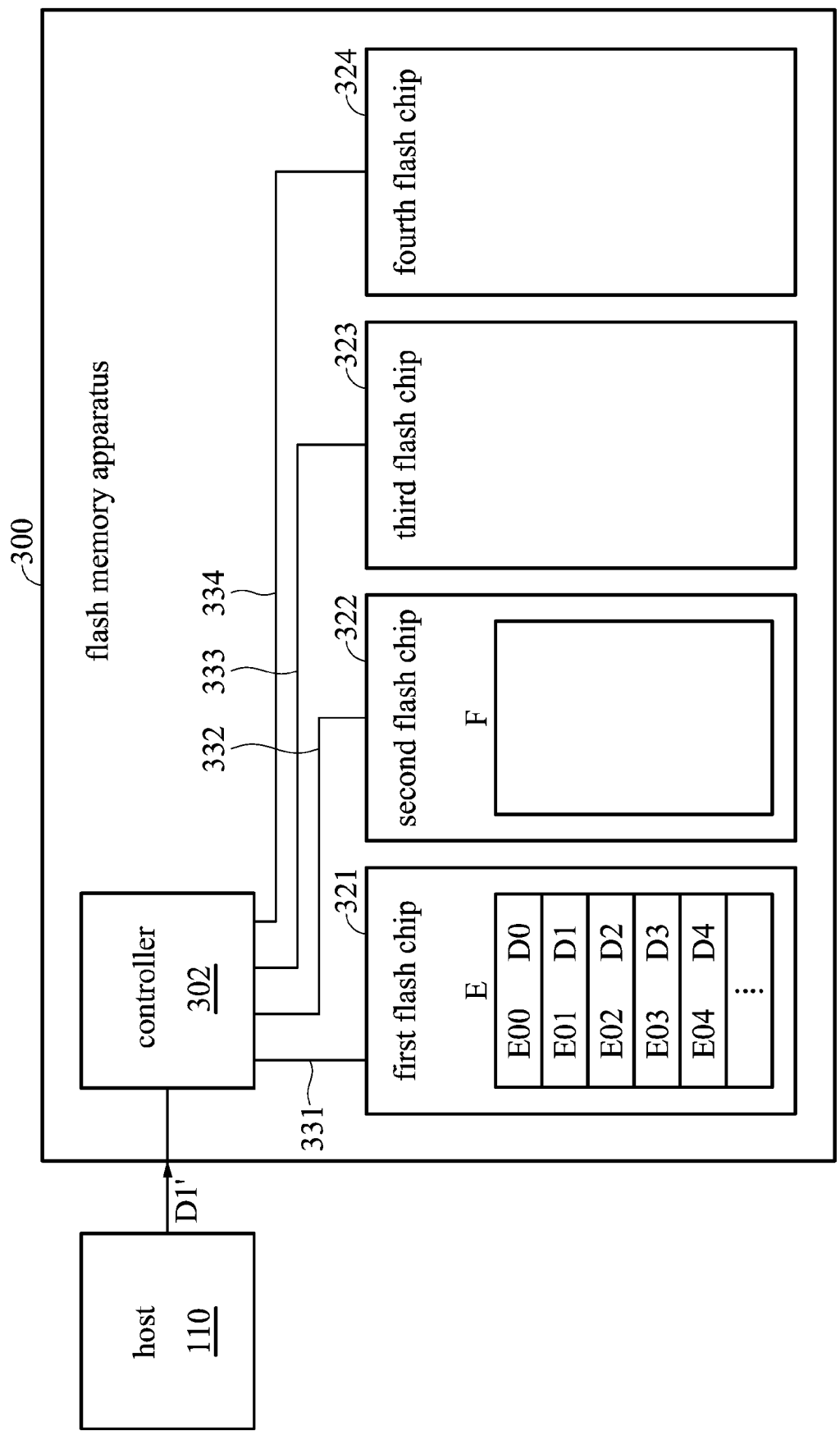
FIG. 3 is a schematic diagram of a flash memory apparatus according to the present invention.

FIG. 3 is a schematic diagram of a flash memory apparatus according to the present invention. The flash memory apparatus 300 comprises a controller 302, a first flash chip 321, a third flash chip 323 and a fourth flash chip 324. Note that although only four flash chips are taken for example, the amount of the flash chips is not limited. The controller 302 respectively uses the control lines control line 331~334 to enable the flash chips 321~324 so that the flash chips 321~324 can be accessed by the controller 302. Importantly, the controller 302 in the present invention performs a special function differently from the prior art, which will be discussed below.

Figure 4:
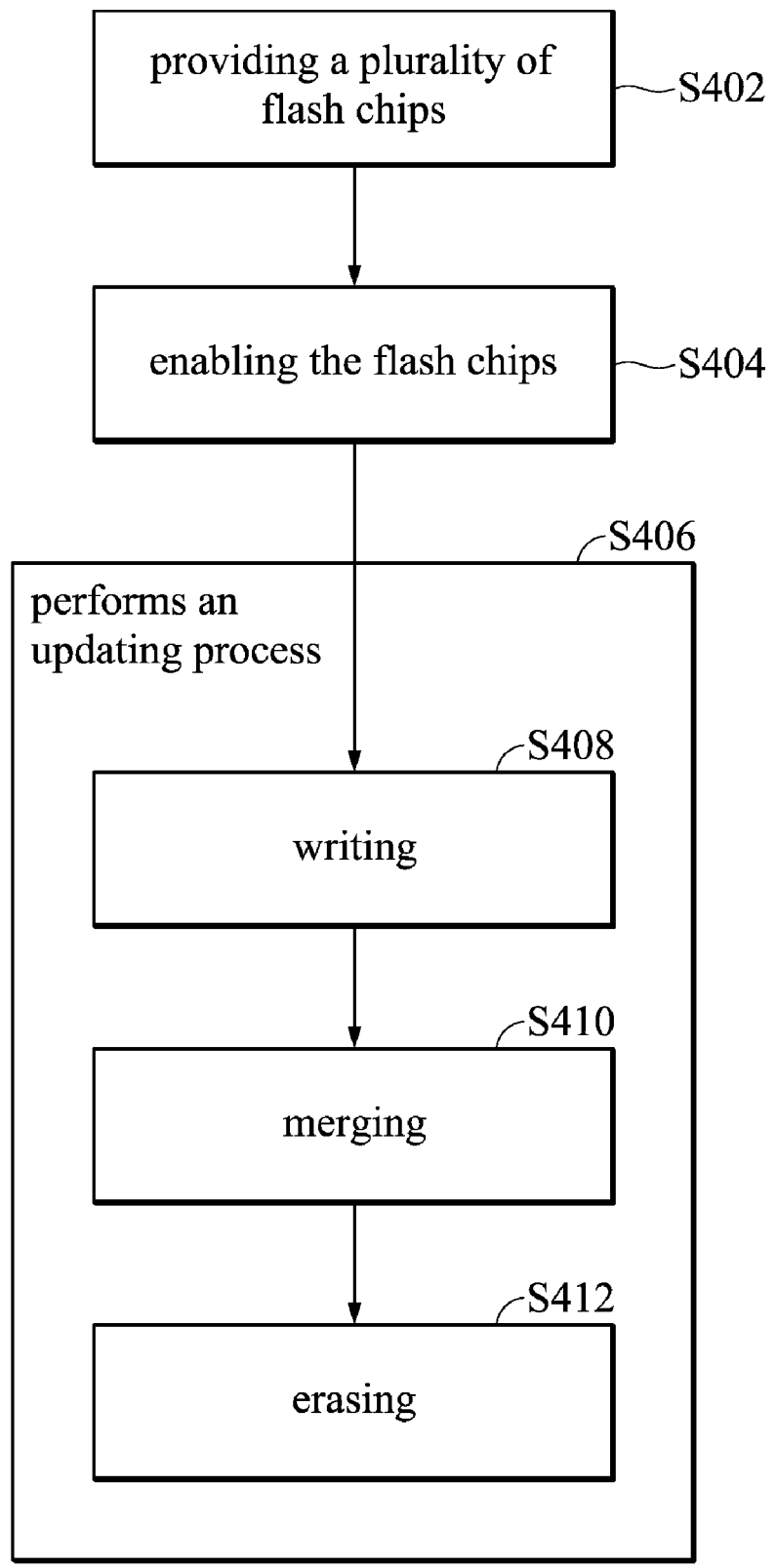
FIG. 4 is a flow chart of the data managing method for the flash memory according to the present invention.

FIG. 4 is a flow chart of the data managing method for the flash memory according to the present invention. Referring to FIG. 3 and FIG. 4, the method comprises providing a plurality of flash chips 321~324 in step S402; enabling the flash chips 321~324 respectively in step S404. In step S406, the controller 302 further performs an updating process. For example, block E in the first flash chip 321 is the one to be updated and comprises data D0~D4 stored in PBA E00~E04 respectively corresponding to LBA L00~L04 (not shown in FIG. 3). In the present invention, the entire updating process S406 further comprises a writing step S408, a merging step S410 and an erasing step S412. In an embodiment, when the flash memory apparatus 300 receives the updated data D1 corresponding to LBA L01 from the host 310 to replace the data D1 and to update block E in the first flash chip 321; controller 302 in step S408, labels the PBA E01 where the data D1 is stored as "pseudo-erased" and further writes the updated data D1 into block F of the second flash chip 322. Following, in step S410, the controller 302 merges block E of the first flash chip 321 and block F of the second flash chip 322. Finally, in step S412, the controller 302 erases block E which is no longer used.

Figure 5:
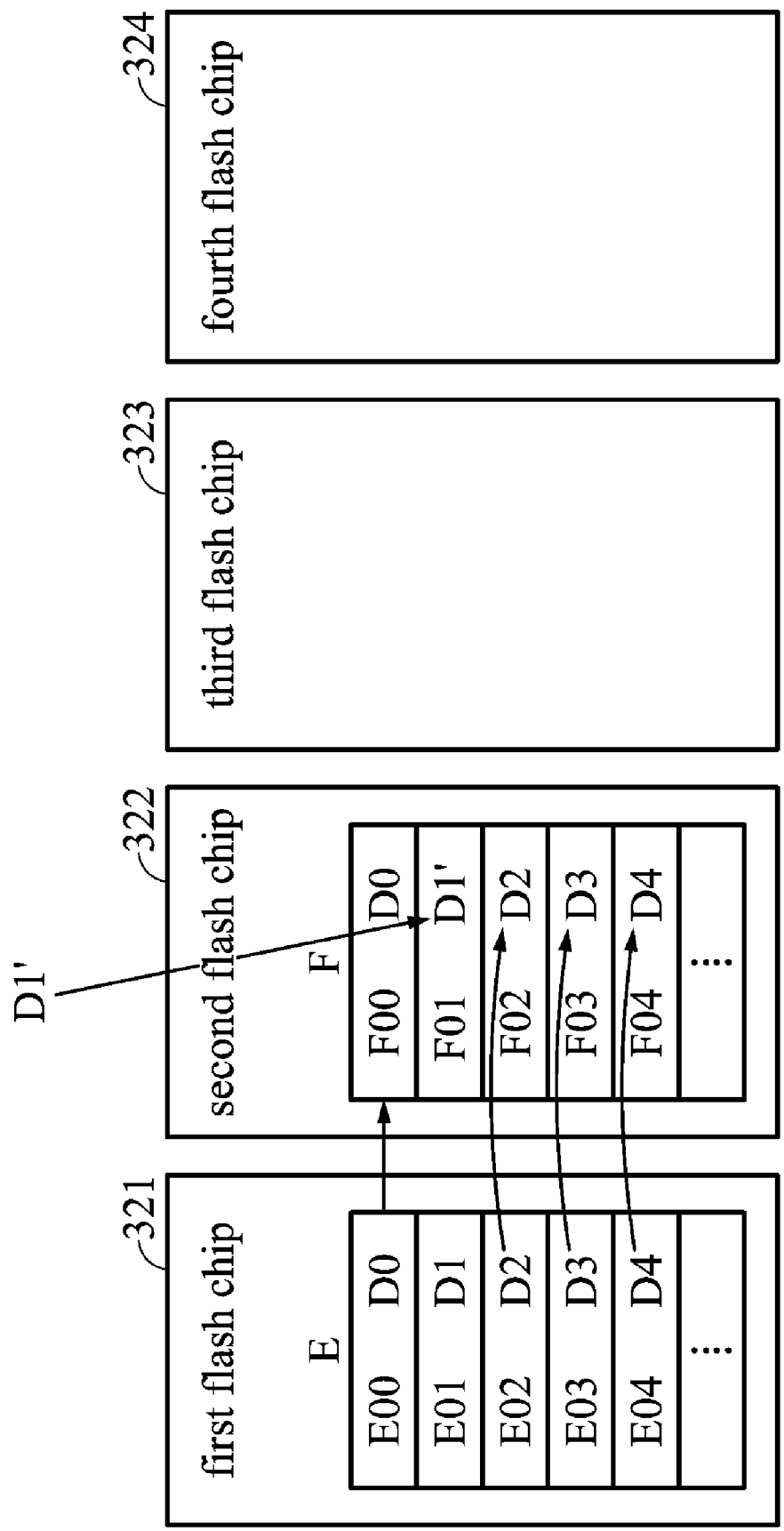
FIG. 5 is illustrative of using the mother/child mode in updating step S406.

There are numerous modes for updating the flash memory according to the present invention, for example, a mother/child mode and a file allocation table (FAT) mode. FIG. 5 is illustrative of using the mother/child mode in the updating step S406. In the mother/child mode, when block E (labeled as a mother block) comprises the data D0~D4 on PBA E00~E04 and receives an updated data D1 corresponding to the LBA L01, the controller 302 performs step S408 and respectively writes the un-updated data D0 and the updated data D1 into PBA F00 and F01 of block F (child block). In the merging step S410, the un-updated data D2~D4 will be copied to PBA F02~F04 and block F will be re-labeled "mother block" from "son block". In the erasing step S412, block E (original mother block) of the first flash chip 321 will be real-erased. In the present invention, the flash chips such as the second flash chip 322, the third flash chip 323 and the fourth flash chip 324 can still be accessed at the same time as block E of the first flash chip 321 is being erased. Since the mother block E and the son block F are allocated on different flash chips, accessing data on the first flash chip 321 and the second flash chip 322 can be performed at the same time when merging. Compared to the prior art, the efficiency in the present invention is increased.

Figure 6:
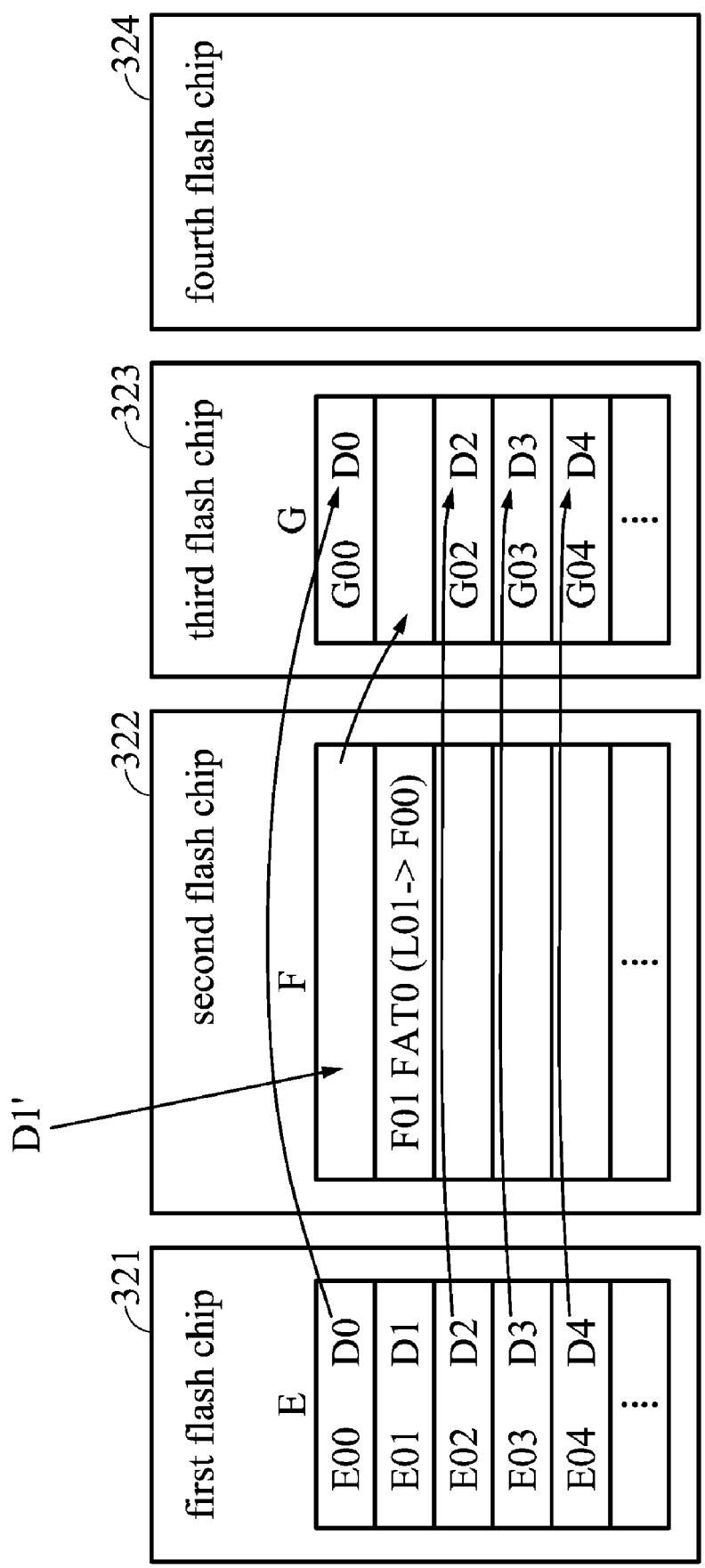
FIG. 6 is illustrative of the using the FAT mode in step S406.

The FAT mode is different from the mother/child mode. FIG. 6 is illustrative of using the FAT mode in step S406. Similarly, when block E comprises the data D0~D4 on the PBA E00~E04 and receives an updated data D1 corresponding to LBA L01, the controller 302 performs step S408 and writes the updated data D1 into block F but holds the un-updated data D0, D2~D4 in block E, and then establishes a file allocation table in block F for recording the correspondence between PBA and LBA. In merging step S410, the controller 302 writes the un-updated data D0, D2~D4 in the block E of the first flash chip 321 and the updated data D1 in block F of the second flash chip 322 respectively into PBA G00, G02~G04 in the block G of the third flash chip 323. Following, in step S412, block E of the first flash chip 321 and block F of the second flash chip 322 is real-erased. The other flash chips (the third flash chip 323 and the fourth flash chip 324) can still be accessed while the erasing of block E and F is happening. Compared with the prior art, the performance of the flash memory apparatus is improved in this mode. Since blocks E, F and G are allocated on different flash chips, accessing the data on the first flash chip 321, the second flash chip 322 and the third flash chip 323 can be performed at the same time, which increases the merging efficiency.

Blocks E, F and G all comprise a plurality of pages which are minimum units for being written. In the present invention, pages are not only for data storage but also for information recording, wherein the information records PBA, LBA and serial numbers. The serial number can be used to record the production sequence of the blocks. Taking the mother/child mode for example, when the mother block is given a serial number 0, the son block, which is established later, would be given a serial number 1. When the son block is updated to be a mother block, a new son block produced will be given a serial number 2. By the serial numbers, those skilled in the art can recognize the production sequence of the blocks easily.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data managing method for a flash memory having a plurality of flash chips, comprising:
   enabling the flash chips respectively; and
   updating the first data in a first block on the first flash chip among the flash chips,
   wherein the step of updating further comprises:
      writing first new data corresponding to the first data into a second block in a second flash chip among the flash chips; and
      merging the first block and the second block into the second block of the second flash chip,
      wherein both of the first new data and the first data are corresponding to a first logical block address.

2. The method as claimed in claim 1, further comprising:
   erasing the first block after the step of merging; and
   accessing the flash chips other than the first flash chip at the time of erasing.

3. A data managing method for a flash memory having a plurality of flash chips, comprising:
   enabling the flash chips respectively; and
   updating the first data in a first block on the first flash chip among the flash chips,
   wherein the step of updating further comprises:
      writing first new data corresponding to the first data into a second block in a second flash chip among the flash chips; and
      merging the first block and the second block into a third block of a third flash chip,
      wherein both of the first new data and the first data are corresponding to a first logical block address.

4. The method as claimed in claim 3 further comprising:
   erasing the first and the second blocks after merging; and
   accessing the flash chips other than the first and second chips at the time of erasing.

5. The method as claimed in claim 4, wherein each of the first, second and third blocks comprises a plurality of pages, and each page is a minimum accessing unit further comprising spare information.

6. The method as claimed in claim 5, wherein the spare information in each block comprises logical block address corresponding to the block.

7. The method as claimed in claim 5, wherein the spare information in each page comprises logical page address corresponding to the page.

8. The method as claimed in claim 5, wherein the spare information in each block comprises a serial number for recording the production sequence of the blocks.

9. A flash memory apparatus, comprising:
   a plurality of flash chips; and
   a controller, used for enabling the flash chips respectively; and updating first data in a first block in a first flash chip among the flash chips, wherein the step of updating further comprises writing first new data corresponding to the first data into a second block on a second flash chip among the flash chips; and merging the first block and the second block into the second block of the second chip, wherein both the first new data and the first data are corresponding to a first logical block address.

10. The flash memory apparatus as claimed in claim 9, wherein the controller further erases the first block after merging, and accesses flash chips other than the first chip at the time of erasing.

11. A flash memory apparatus, comprising:
a plurality of flash chips; and
a controller, used for enabling the flash chips respectively; and updating first data in a first block in a first flash chip among the flash chips, wherein the step of updating further comprises writing first new data corresponding to the first data into a second block on a second flash chip among the flash chips; and merging the first block and the second block into a third block of a third chip, wherein both the first new data and the first data are corresponding to a first logical block address.

12. The flash memory apparatus as claimed in claim 11, wherein the controller further erases the first and second blocks after merging, and accesses flash chips other than the first and second chip at the time of erasing.

13. The flash memory apparatus as claimed in claim 12, wherein each of the first, second and third blocks comprises a plurality of pages, and each page is a minimum accessing unit further comprising spare information.

14. The flash memory apparatus as claimed in claim 13, wherein the spare information in each block comprises a logical block address corresponding to the block.

15. The flash memory apparatus as claimed in claim 13, wherein the spare information in each page comprises logical page address corresponding to the page.

16. The flash memory apparatus as claimed in claim 13, wherein the space information in each block comprises a serial number for recording the production sequence of the blocks.

* * * * *